(12) United States Patent
Peterson et al.

(10) Patent No.: US 11,016,609 B2
(45) Date of Patent: May 25, 2021

(54) DISTANCE-TIME BASED HIT-TESTING FOR DISPLAYED TARGET GRAPHICAL ELEMENTS

(71) Applicant: Microsoft Technology Licensing, LLC, Redmond, WA (US)

(72) Inventors: Andrew Douglas Peterson, Bothell, WA (US); Jeffrey Stall, Kirkland, WA (US); Eric Norman Badger, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 371 days.

(21) Appl. No.: 15/583,468

(22) Filed: May 1, 2017

(65) Prior Publication Data
US 2017/0235426 A1 Aug. 17, 2017

Related U.S. Application Data

(63) Continuation of application No. 12/876,036, filed on Sep. 3, 2010, now Pat. No. 9,639,265.

(51) Int. Cl.
*G06F 9/48* (2006.01)
*G06F 3/041* (2006.01)
(Continued)

(52) U.S. Cl.
CPC ........ *G06F 3/04186* (2019.05); *G06F 3/0237* (2013.01); *G06F 3/0482* (2013.01); *G06F 3/04886* (2013.01); *G06F 3/0414* (2013.01)

(58) Field of Classification Search
CPC .. G06F 3/0418; G06F 3/0237; G06F 3/04186; G06F 3/0482; G06F 3/04886; G06F 3/0414
See application file for complete search history.

(56) References Cited

U.S. PATENT DOCUMENTS

| 6,018,711 A | * | 1/2000 | French-St. George .................... G10L 15/22 455/231 |
| 6,717,600 B2 | | 4/2004 | Dutta et al. |

(Continued)

OTHER PUBLICATIONS

Albinsson et al., "High Precision Touch Screen Interaction," CHI 2003, Apr. 5-10, 2003, 8 pages.

(Continued)

*Primary Examiner* — Jennifer N To
*Assistant Examiner* — K C Chen
(74) *Attorney, Agent, or Firm* — Alleman Hall Creasman & Tuttle LLP

(57) ABSTRACT

The described embodiments allow for the association of an interaction with a target in a display. One embodiment includes detecting an interaction with an area associated with a graphical element in a display, detecting a later interaction displaced from the area, and associating the later interaction with a target in the display based at least on the time between the interaction with the area and the later interaction. User interactions with one or more displayed hit targets are based on corresponding time-varying hit zones. In response to unlimited user interaction with a hit target, subsequent user selections are validated based on a time-varying hit zone that is typically extended with respect to the previously selected hit target. The extended selection zone can overlap one or more other hit targets to favor re-selection of the individually selected hit target. The extended selection zone generally decreases as a function of time from prior selections of a hit zone.

14 Claims, 8 Drawing Sheets

(51) Int. Cl.
  *G06F 3/023*     (2006.01)
  *G06F 3/0488*    (2013.01)
  *G06F 3/0482*    (2013.01)

(56) References Cited

U.S. PATENT DOCUMENTS

| | | | |
|---|---|---|---|
| 6,961,912 | B2 | 11/2005 | Aoki et al. |
| 7,098,896 | B2 | 8/2006 | Kushler |
| 7,641,550 | B2 | 1/2010 | Ohta |
| 8,386,965 | B2 | 2/2013 | Fleizach et al. |
| 2002/0067345 | A1 | 6/2002 | Endo |
| 2004/0178994 | A1* | 9/2004 | Kairls, Jr. ............. G06F 3/0481 345/173 |
| 2005/0187023 | A1 | 8/2005 | Miyamoto |
| 2006/0128468 | A1 | 6/2006 | Yoshikawa |
| 2007/0075985 | A1 | 4/2007 | Niida |
| 2007/0097096 | A1 | 5/2007 | Rosenberg |
| 2008/0064486 | A1* | 3/2008 | Pryzby ................... G07F 17/32 463/25 |
| 2008/0189627 | A1* | 8/2008 | Nikitin ................. G06F 3/0481 715/762 |
| 2009/0007001 | A1 | 1/2009 | Morin et al. |
| 2009/0051661 | A1 | 2/2009 | Kraft et al. |
| 2009/0174667 | A1 | 7/2009 | Kocienda et al. |
| 2009/0177981 | A1 | 7/2009 | Christie et al. |
| 2010/0066640 | A1* | 3/2010 | Wakefield ............. G06F 1/1624 345/1.1 |
| 2010/0079310 | A1* | 4/2010 | Nachman ............ G06F 3/04886 341/23 |
| 2010/0115426 | A1* | 5/2010 | Liu ...................... G06Q 10/107 715/757 |
| 2010/0185681 | A1* | 7/2010 | Han .................... G06F 3/04817 707/802 |

OTHER PUBLICATIONS

Karlson et al., "ThumbSpace: Generalized One-Handed Input for Touchscreen-Based Mobile Devices," Proceedings of Interact 2007, Springer Verlag (2007), pp. 324-338.

Ren et al., "The Adaptive Hybrid Cursor: A Pressure-based Target Selection Technique for Pen-based User Interfaces," Human-Computer Interaction—Interact 2007, vol. 4662, pp. 310-323, 2007.

* cited by examiner

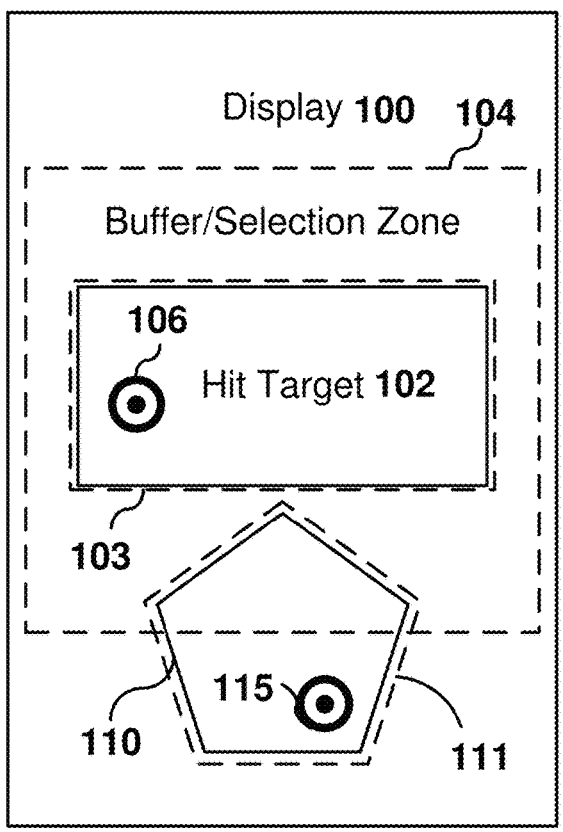 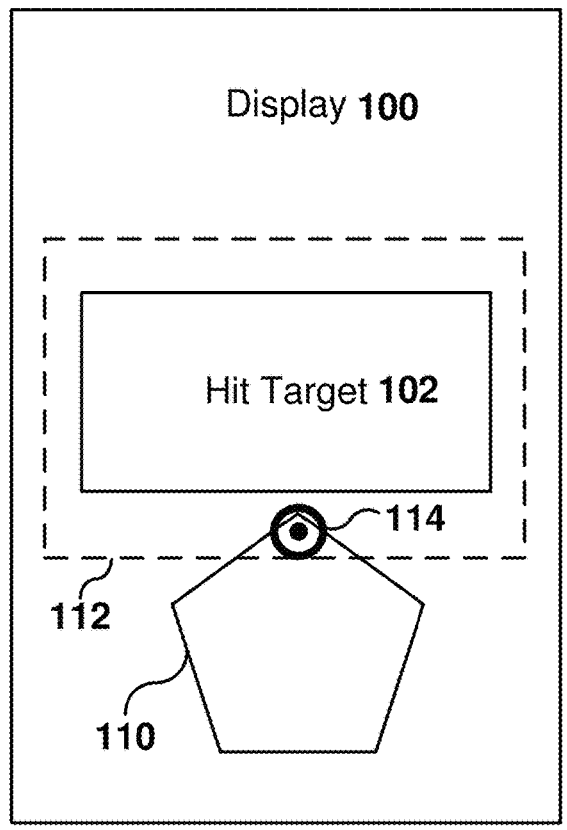
FIG. 1A
FIG. 1B

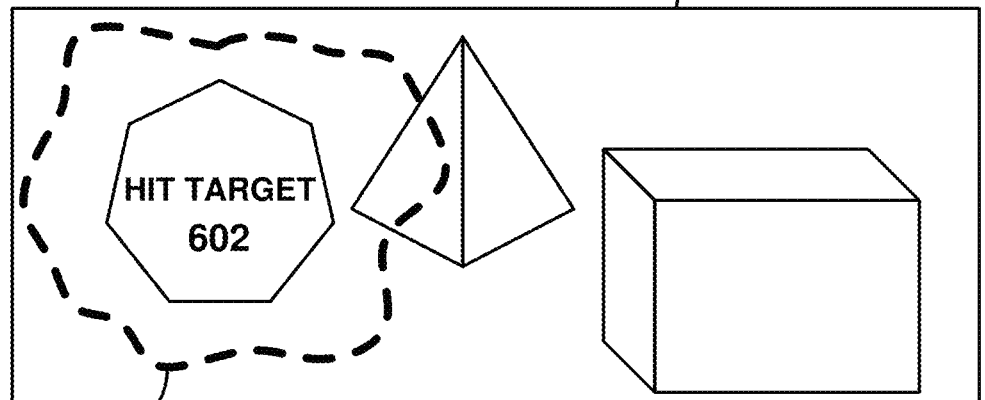
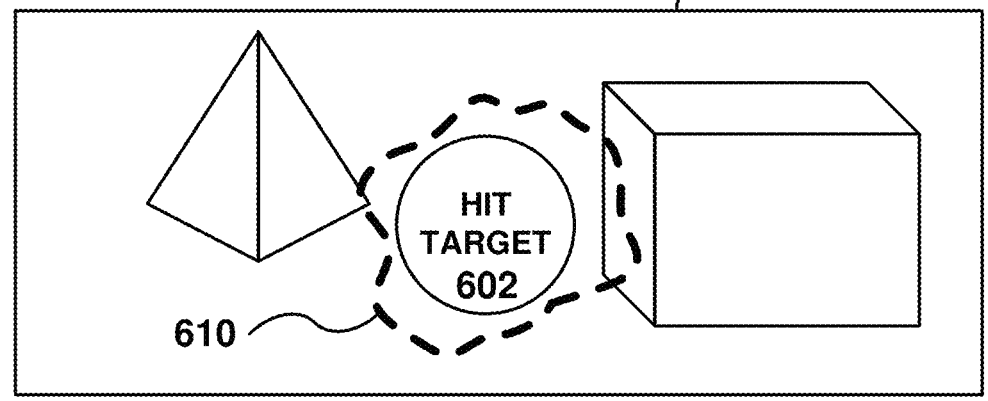
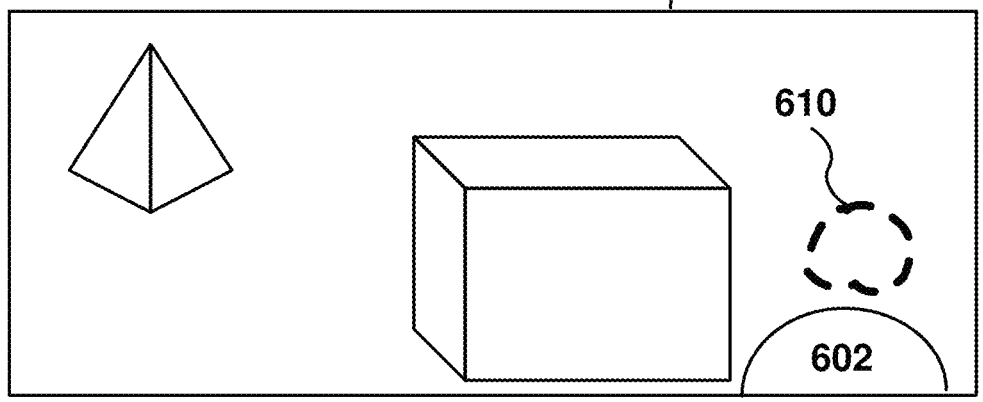

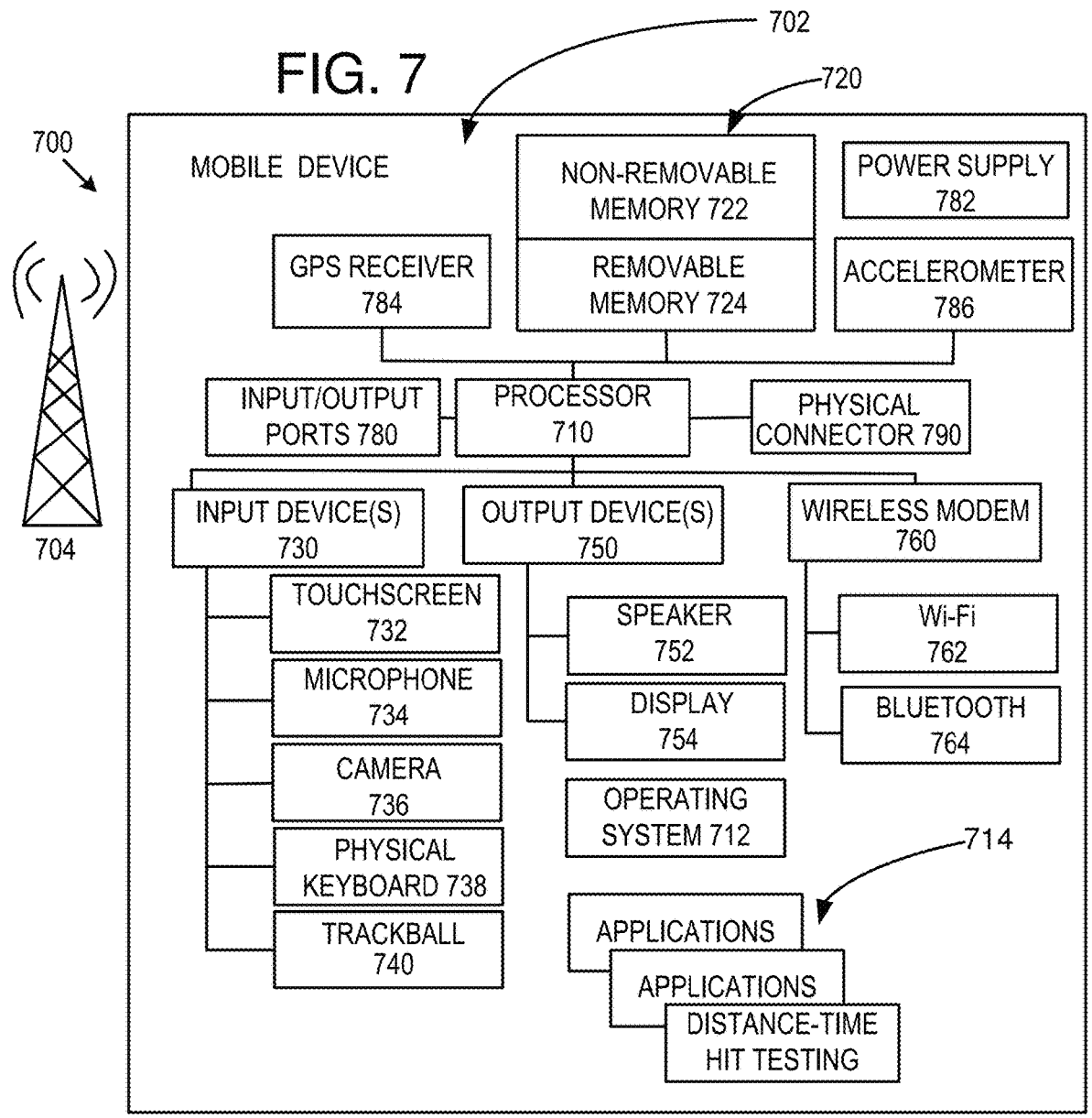

DISTANCE-TIME BASED HIT-TESTING FOR DISPLAYED TARGET GRAPHICAL ELEMENTS

CROSS REFERENCE TO RELATED APPLICATIONS

This application is a continuation of U.S. patent application Ser. No. 12/876,036, filed Sep. 3, 2010, which is hereby incorporated by reference.

FIELD

The disclosed embodiments relate generally to user interfaces, and more particularly to a hit-test user interface.

BACKGROUND

Mobile devices with capacitive or resistive touch capabilities are well known. Modern mobile phones have evolved over recent years to the point where they now possess a broad range of capabilities. They are not only capable of placing and receiving mobile phone calls, multimedia messaging (MMS), and sending and receiving email, they can also access the Internet, are GPS-enabled, possess considerable processing power and large amounts of memory, and are equipped with high-resolution color liquid crystal displays capable of detecting and identifying an approximate location of a touch input. As such, today's mobile phones are general purpose computing and telecommunication devices capable of running a multitude of applications. For example, modern mobile phones can run word processing, web browser, navigation system, media player and gaming applications.

Along with these enhanced capabilities has come a demand for larger displays to provide a richer user experience. Mobile phone displays have increased in size to the point where they can now consume almost the entire viewing surface of a phone. To increase the size of displays any further would require an increase in the size of the phones themselves. Even with the display size being at its maximum, the content on the display remains relatively small. Indeed, selecting content in a display with a pointing device such as a mouse or touch screen often requires slow, precise motions because the desired content is generally small relative to a user's finger and often positioned near other selectable content. With a user's finger moving about the display rapidly and the finger being large relative to the desired content, it is difficult to select desired content quickly and accurately. As a result, touch screen user interfaces and other pointing devices often provide inconsistent results and errors, causing user frustration.

SUMMARY

This Summary is provided to introduce a selection of concepts in a simplified form that are further described below in the Detailed Description, which proceeds with reference to the accompanying figures. This Summary is not intended to identify key features or essential features of the claimed subject matter, nor is it intended to be used to limit the scope of the claimed subject matter.

The above deficiencies and other problems associated with interacting with displays are reduced or eliminated by the disclosed embodiments. The claimed subject matter is not limited to implementations that solve any or all of the noted disadvantages.

The described embodiments allow for the association of an interaction with a hit target presented as a graphical element in a display. In one embodiment, a first user selection of a graphical element in a display is detected, and a second, subsequent user interaction displaced from the graphical element is detected, and this second user interaction is associated with the displayed target based on a time between the detected user interactions. In another embodiment, a validation of the location of the second user interaction is based on a dynamic buffer area associated with the hit target. In other embodiments, the dynamic buffer is established as a function of elapsed time since the first detected interaction.

The foregoing and other features, and advantages of the disclosure will become more apparent from the following detailed description, which proceeds with reference to the accompanying figures.

BRIEF DESCRIPTION OF THE DRAWINGS

FIG. 1A illustrates an exemplary embodiment of a display presenting a hit target that is associated with a buffer zone.

FIG. 1B illustrates an exemplary embodiment of the display of FIG. 1A illustrating the hit target and an associated reduced buffer zone.

FIG. 6A illustrates an exemplary embodiment of an animated hit target with a variable buffer zone.

FIG. 6B illustrates an exemplary embodiment of an animated hit target with a reduced buffer zone.

FIG. 6C illustrates an exemplary embodiment of an animated hit target with a variable buffer zone.

FIG. 7 is a system diagram depicting an exemplary mobile device.

DETAILED DESCRIPTION

Figure 2:
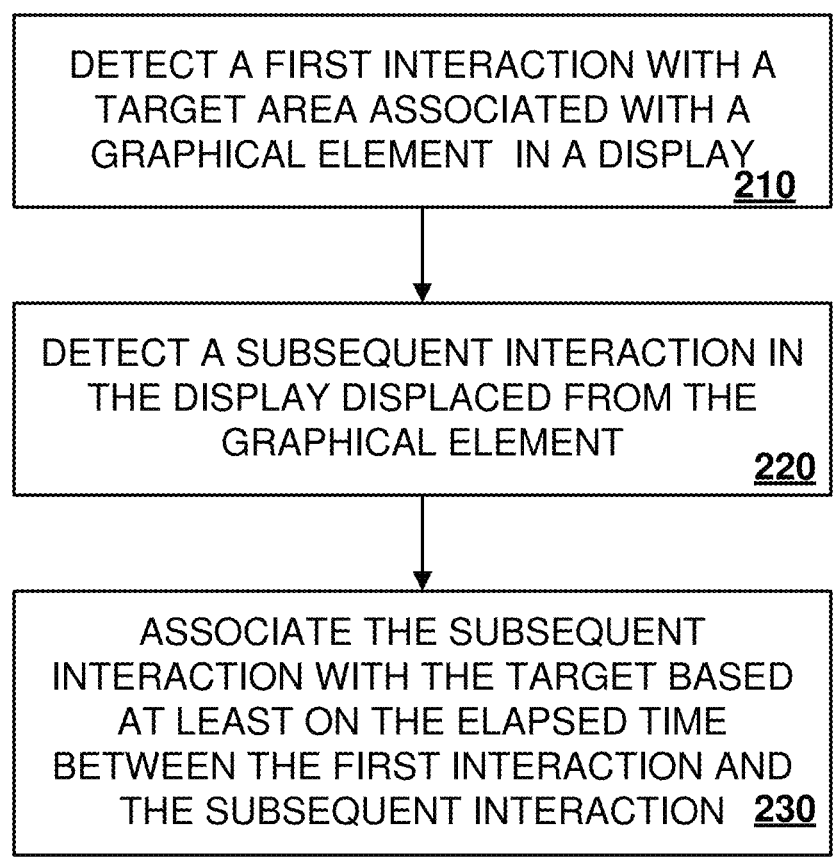
FIG. 2 is a block diagram illustrating an exemplary method of associating an interaction with a target in a display.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

With reference to FIG. 1A, a display 100 is configured to present visual targets 102, 110 (also referred to as "hit targets") to a user for selection of a menu item or other input to one or more applications configured to execute on a mobile computing device or other computing device. In some examples, the display 100 is associated with a touch screen that can be used to indicate a user selection, but other pointing devices can be used. The hit target can be based on one or more displayed characters that are arranged to form an on screen keyboard or partial keyboard for entry of alphanumeric or other data. Alternatively, the hit target 102 can be associated with one or more items from a drop down menu, a radio button, or other user input selection.

The display 100 is generally configured to display one or more hit targets such as the hit targets 102, 110 so that a user is presented with a variety of input options. Typically, the hit targets 102, 110 are associated with respective selection zones 103, 111 that substantially overlap the hit targets 102, 110. User selection of a particular menu item, character, or other input can be indicated by identifying the intended selection with a pointing device such as a touch screen, mouse, or trackball, or camera-based motion indicator. For example, a camera-based motion indicator can associate a camera recognized user bodily motion (e.g. hand wave motion) with the selection of a menu item. While the selection zones 103, 111 can overlap their respective hit targets, selection zones can be larger, smaller, be at different locations, have different shapes, sizes, margins or perimeters than their respective hit targets. In addition, selection zone shape, size, location, or other characteristics can vary in time, and conveniently be time varying based on an elapsed time since selection of a particular hit target. As described herein, selection zones are generally time varying and extend beyond the static hit target to at least some extent. A selection zone typically includes and extends beyond a static hit target.

As shown in FIG. 1A, upon user selection of the hit target 102 at a location 106, an associated selection zone 104 is defined that is larger than the hit target 102 and the initial selection zone 103. For convenience, such a selection zone can be referred to as "inflated" or "extended." The selection zone 104 overlaps the hit target 110 and its associated selection zone 111, but previous user selection of a location associated with the hit target 102 prioritizes the area of the selection zone 104 for selection of the hit target 102. Selection of another hit target, for example, selection of the hit target 110 at a location 115 that is not within the selection zone 104 de-prioritizes the hit target 102 and the associated initial selection zone 103 is again activated.

As shown in FIG. 1A, a user can indicate a first interaction at a location 106 associated with the hit target 102 and the extended selection zone 104 can activate at a predetermined size. The size of extended selection zone 104 can change over time and can shrink in size. When activated, the extended selection zone 104 can overlap with the visual boundary of other content in the display 100 such as the hit target 110. Typically, as shown in FIG. 1B, the extended selection zone 104 decreases as a function of elapsed time from a prior selection of the hit target 102 as shown by a reduced extended selection zone 112. In FIG. 1B, the reduced extended selection zone 112 overlaps with hit target 110 at a location 114 of a second user interaction. The second interaction at location 114 is associated with hit target 102 even though this interaction is at the hit target 110 and within selection zone 111 as the reduced extended selection zone 112 is prioritized.

Users often interact quickly with the same visual elements in graphical displays. Common user interfaces allow selection, activation, or interaction with visual elements based on a static visual boundary of the visual element. Allowing for a dynamic boundary such as extended selection zones 104, 112 to be associated with the hit target 102 provides for a larger area of interaction with the hit target 102, permitting rapid and less precise interactions with the display 100 to be associated with the hit target 102. As the time between the first user interaction and a second user interaction with the hit target 102 increases, the size of the associated extended buffer zone generally decreases and eventually returns to its initial size.

FIG. 2 is a block diagram illustrating an exemplary method of associating an interaction with a target in a display. At block 210, a user interaction is detected with an area associated with a graphical element in a display. For example, an area associated with a graphical element can be the visual boundary of the element in the display, or some other predefined hittable boundary associated with the element. In some embodiments, an interaction can be selecting, activating, or contacting an element in a display. For example a user can click with a mouse on a graphic in a display, activate a function with a pointer, trigger input from a hardware input device to the display, or perform a touch action (e.g., press, tap, or drag) on an image in a touch screen as an interaction. Typical targets include images, buttons, objects, graphical elements, or functions.

At block 220, a subsequent interaction with the display is detected at a location displaced from the area of the graphical element. The subsequent interaction can be with an area different than the area associated with the graphical element. For example, the interaction can be with an area of the display at which another graphical element is displayed. In other embodiments, a distance from the graphical element area and the location associated with the subsequent interaction can be within a maximum, a minimum, a predetermined, or a predefined distance. For example, if the subsequent interaction is not within a maximum dimension allowable for a dynamic margin associated with the previously selected target, then the subsequent interaction location is evaluated without reference to a dynamic selection zone or a dynamic selection perimeter such as that associated with an inflated or extended selection zone. Similarly, in some examples, the subsequent interaction can be within a maximum, minimum, or predefined time. For example, if the second interaction is not within a maximum allowed time for an expanded selection zone, then the subsequent interaction can be evaluated without reference to a dynamic selection zone or a dynamic selection perimeter such as that associated with an inflated or extended selection zone.

At block 230, the subsequent interaction is associated with the previously selected target based at least on an elapsed time since the previous interaction. In one embodiment, the location of the later interaction can be validated against a dynamic perimeter or area for the graphical element calculated as a function of time. For example, if the location of the interaction is acceptable relative to the calculated perimeter (e.g., within the perimeter) then the interaction can be linked with the associated graphical element. If the location of the interaction is not acceptable based on a calculated perimeter then the interaction can be associated with a different graphical element in the display, or linked with no element at all (e.g., recognized as a mistake). The calculated perimeter can be evaluated based on a time of the second interaction or a time between the first interaction and the second later interaction. The perimeter, for example, can be at its largest when the duration between the two interactions is the smallest (e.g., immediately after the first user interaction), and decreases as a function of time until returning to a static perimeter. A variety of functions that can be used to define such decreases include linear functions, exponentials, or other functions.

Typically, a location of a user interaction is based on one or more coordinate pairs such as (x, y) pairs that can be evaluated in order to associate the interaction with one or more or no targets. For example, a touch screen can be configured to detect a finger press and obtain an estimate of a finger press location as coordinates (e.g., screen coordinates (x, y)). If one (or more) extended selection zones are active, the detected screen coordinates are evaluated to determine if they are associated with a particular extended selection zone. Typically, only one such extended selection zone is active, but multiple active extended zones can be provided in a sequence from a most recently activated to an oldest. In this case, the coordinates can be evaluated with respect to these selection zones sequentially, generally stopping as soon as the coordinates are determined to be within or associated with a particular selection zone.

In one embodiment, a compositor can be computer-executable instructions used in rendering to control the layering and animations of elements that appear to the user on a visual screen. The compositor can be used to determine what window or visual element is located at a screen coordinate provided, and to provide a client (window) coordinate translation for that window or visual element, taking into account any in progress animations, or transforms that may be applied to the element, and/or origin changes. Typically to identify a user interaction with a target, a search can be performed through a tree data structure of visual elements. A dynamic boundary or dynamic zone such as associated with extended selection zones can be evaluated with respect to detected coordinates to allow bypassing a tree search of visual elements. Thus, an activated selection zone, even if not expanded with respect to its unactivated size, can permit rapid detection of user interaction with a common target.

Figure 3:
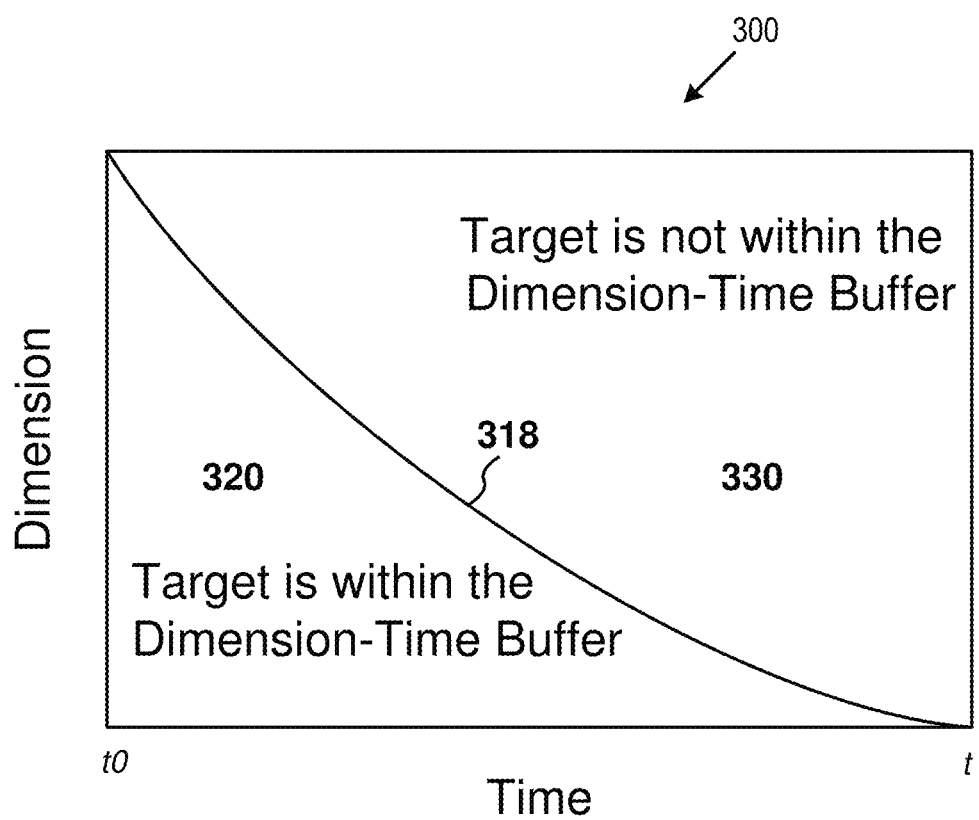
FIG. 3 illustrates a graph of a dynamic boundary that reduces in distance as a function of time.

Dimensions of a dynamic selection buffer, selection zone, or selection area associated with a target display element generally decrease as a function of elapsed time from a previous selection of the display element. FIG. 3 is a representative graph 300 illustrating a representative dimensional change as a function of elapsed time. As shown in FIG. 3, an arbitrary dimension such as length, width, radius or other buffer dimension decreases monotonically from an initial inflated dimension at a time $t_0$ after an initial selection of the target display element to a pre-selection dimension at a subsequent time $t_1$. As shown in FIG. 3, the buffer dimension change is associated with a smooth curve 318, but in other examples linear, exponential, polynomial or other functions can be used. User selection at locations/times corresponding to a region 320 are within a buffer and thus are generally associated with selection of the previously selected display element, while user selection at locations/times corresponding to the region 330 are outside the buffer and are not associated with the previously selected display element. If an interaction is detected that correlates with region 320, the target for the interaction in the display can be determined and a normal hit test and search of the visual elements can be avoided. Avoiding a search and a normal hit test can save processing resources.

Figure 4:
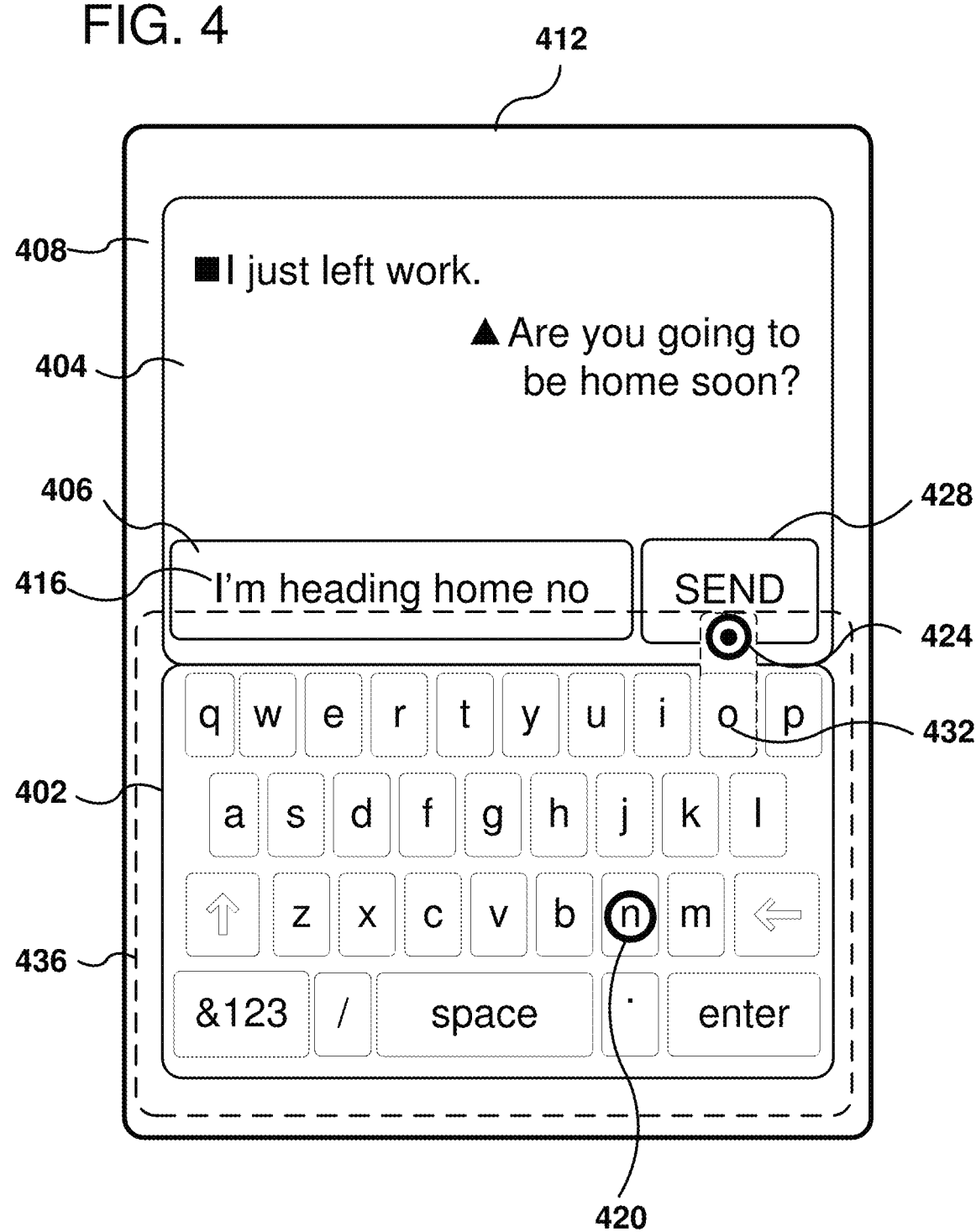
FIG. 4 illustrates an exemplary embodiment of associating an interaction with a target in a display.

FIG. 4 illustrates association of a touch event with an on screen keyboard 402 in a touch screen 408 on a mobile device 412. A display area 404 is provided for display of previous communications, and a message entry area 406 is provided for entry of new messages. Selection of one or more characters with the on screen keyboard 402 is associated with activation of a dynamic buffer zone 436 that overlaps a displayed SEND button 428. As shown in FIG. 4, a user types a message 416 using the on screen keyboard 402, and the message 416 is displayed in the message entry area 406. In typing the message 416, the user taps the letter "n" 420 with a thumb, and then rapidly taps at position 424 on the touch screen 408 in an attempt to select the letter "o." Selection of the letter "n" activates or re-activates the dynamic buffer zone 436. A portion of the SEND button 428 is displayed on the touch screen 408 at the tapped position 424. Although the tap at position 424 is on the "SEND" button 428, the tap at position 424 is associated with the letter "o" 432, because of the previous interaction with the on screen keyboard 402. The dynamic buffer zone 436 is activated, and locations within the dynamic buffer zone 436 are associated with on screen keyboard inputs at areas that overlap other input targets such as the SEND button 428. Thus, the location 424 is associated with keyboard input, and a nearest letter (in this case, "o") is selected as an input. The size, position, orientation, perimeter, or other characteristics of the dynamic buffer 436 can be a function of time between the tap on the letter "n" 420 and the tap at position 424. Because the tap at location 424 is associated with the on screen keyboard 402, the keyboard stays active in the touch screen 408 instead of having the on screen keyboard 402 deactivate while sending message 416. As a result, a user error is avoided because the user message continues to be input, instead of an incomplete message being sent due to the tap at location 424 which misses the actual displayed keyboard area.

Figure 5:
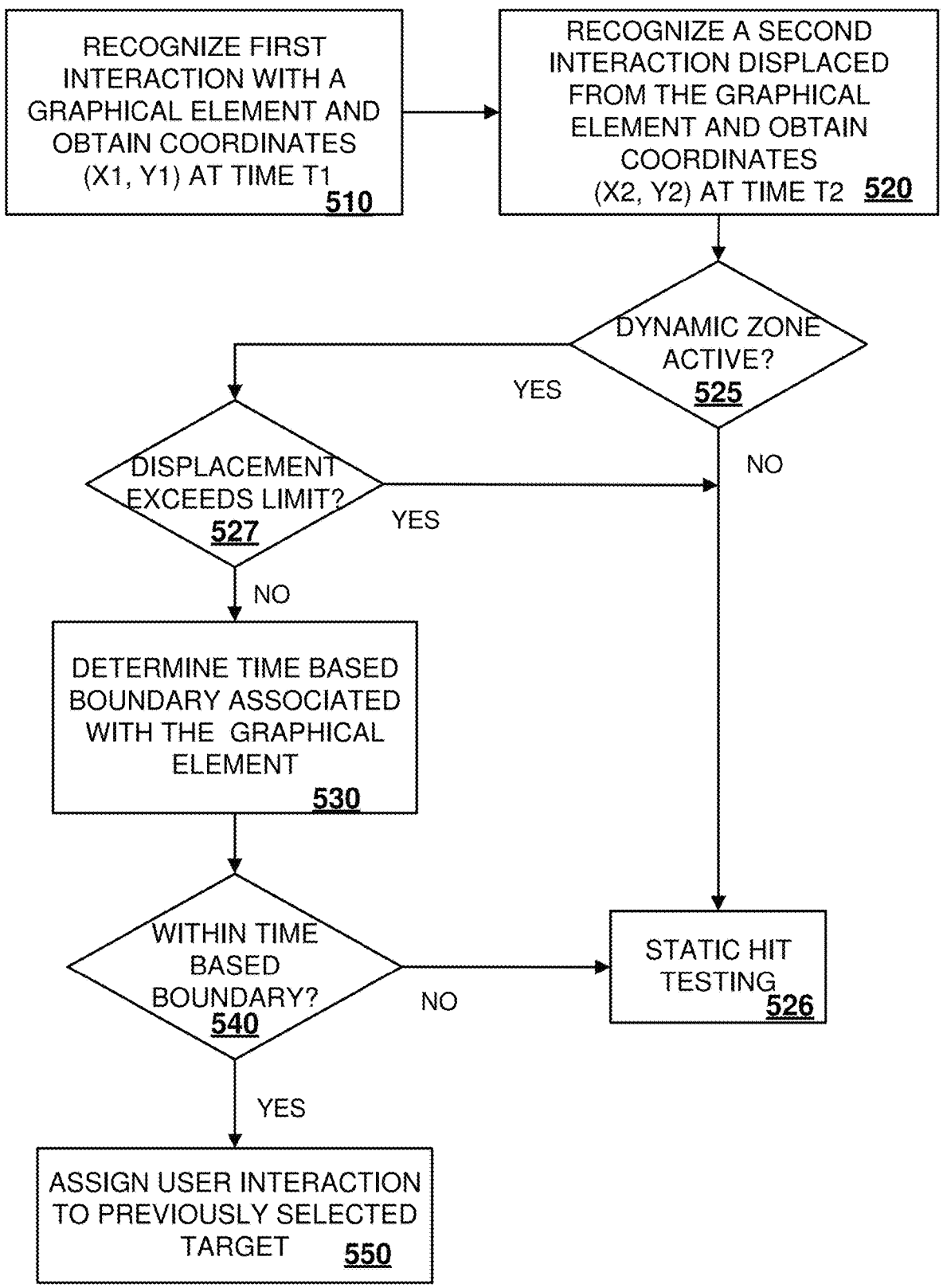
FIG. 5 is a block diagram illustrating an exemplary method of associating an interaction with a target in a display.

FIG. 5 is a block diagram illustrating an exemplary method of associating an interaction with a target in a display. At block 510 a first interaction with a graphical element (i.e., a target window) in a display is recognized. Typically, the first interaction is associated with determination of coordinates $(x_1, y_1)$ corresponding to a location of a user input such as a touch to a touch screen or location of a mouse click at a time $t_1$. Various kinds of user interactions can be detected. For example, the user can perform a touch action on a character in a touch screen based game. The user interaction can be based on a keyboard, a mouse, a touch action, a game controller function, or a motion gesture. The graphical element in the display can be a one, two, or three dimensional image, an animation, a button, a field, an image composed of smaller images (e.g., a keyboard), an icon, text, a graphic, or a background and the display can be a computer screen, a television screen, a mobile device screen, a three dimensional screen, a touch screen, or a projection screen. In response to the first interaction and using the detected coordinates $(x_1, y_1)$, an associated user input or user action selection is provided to one or more applications executable on a mobile or other computing device. Typically, the detected coordinates $(x_1, y_1)$ are used to determine which displayed target is intended for selection by the user. This determination can be executed by searching target areas for currently displayed targets until a target area containing or otherwise associated with the detected coordinates $(x_1, y_1)$ is identified.

At block 520 a second interaction with the display at a location away from the visible graphical element is recognized. For example, the user can contact the touch screen somewhere other than where a character in a game is displayed. Typically, the second interaction is based on coordinates $(x_2, y_2)$ at a time $t_2$ associated with the second interaction. At 525, availability of an extended or inflated selection zone is determined. If such a selection zone is not available, the second interaction is processed without such a selection zone. For example, if a prior user interaction was substantially earlier, any previously established dynamic selection zones may have reverted to static values. If the second interaction is within a selected time or a maximum or predefined time from the first previous interaction, processing can be based on an extended selection zone. The determination of the availability of such a selection zone can be based on a time difference $t_2-t_1$ with respect to a maximum duration of extended selection zones. Alternatively, a flag can be set indicating that one or more extended zones are available and the flag checked as the coordinates $(x_2, y_2)$ are obtained. For example, if the second interaction is made later than a maximum time then a traditional static selection zone based hit test can be performed at block 526 and a boundary or other characteristic of a dynamic selection zone need not be calculated because the boundary is reduced to its static size.

At block 527, a distance of the location of second interaction based on the coordinates $(x_2, y_2)$ from one or more displayed graphical elements is determined. If the distance is not within a maximum or predefined distance (such as a number of pixels or an actual distance in inches) from a graphical element, static hit testing is used at the block 526 and evaluation of dynamic extended zones is bypassed. If the second interaction is further than a maximum distance from the graphical image associated with the first interaction, then a static hit test can be performed and dynamic boundary determinations can be omitted.

At block 530 a time based boundary associated with the previously selected graphical element is determined. At block 540, the coordinates $(x_2, y_2)$ are evaluated to determine if these coordinates are within the time based boundary. If so, the second interaction is assigned to the previously selected target at block 550. If not, static hit testing can be completed at block 526.

The evaluation of the time based boundary with respect to the coordinates $(x_2, y_2)$ can be based on a predetermined distance or direction from the boundary that is a function of time, an interaction mass associated with a magnitude of user pressure on a pressure sensitive pointing device such as a pressure sensitive touch screen, stylus, or other input device. The time based boundary can also be a function of interaction mass so that for inputs with larger pressures or larger sized contact geometries, the time based boundary can extend farther (or less far) than the time based boundary associated with lower pressures or smaller sized contact geometries.

The time based boundary can be displayed and, as noted above, can depend on other variables such as the device, screen, display context, as well as the size, location, motion, dimensionality, or transformation of the graphical element, or a distance between the graphical element and the second interaction, the history of usage patterns, or a user configuration. For example, the boundary can vary for at least one dimension of the graphical element. In some example embodiments the boundary becomes smaller in size, while in other embodiments the boundary increases in size based on the variables. The time based boundary can be computed based on an equation that takes these variables into consideration. One exemplary embodiment of an equation for evaluating a dynamic boundary can be $d=mt+b$. In this exemplary embodiment d is a buffer distance that is calculated based on an adjustable scaled slope modifier m, a time duration between interaction events t, and a starting point b. Although in other embodiments a boundary can be calculated using other formulas with values that are adjustable for targeting an object in a display. In some embodiments change in time can be determined by evaluating a clock, measuring cycles, measuring a duration, calculating a period, or assess an interval. Also, in some embodiments the time can be a fraction or multiple of the time determined between interactions with the display.

A user can also configure time based boundaries in some or all visual elements. For example, a user can select extended dimensions and durations, and indicate visual elements to which extended dimensions should not be applied. Also, a time based boundary can depend on usage patterns. A user's patterns can be automatically learned or set in a configuration and time based boundaries can be based on the user's patterns. For example, a user's typing speed (e.g., average typing speed) can be used, or the frequency with which an item or element is used by the user can be used as a variable for the time based boundary. For example, if an item has been selected by the user within a predetermined time before the current interaction the item's boundary can be activated or expanded. If the item has not been selected by the user within a predetermined time then the item's time based boundary can be shrunk, or deactivated. Also the time based boundary can be additionally based on a hierarchy of visual elements that have been previously used. For example, if various visual elements are interacted within a sequence, the subsequent time based boundaries associated with the items can be based in part on the sequence in which the items were interacted with.

In traditional hit testing an interaction is detected and a search of the visible graphics that are hittable is conducted to match the location of the interaction with a hittable visible graphic in the display. For example, hit testing can associate a touch action on a touch screen with a function. A dynamic boundary can eliminate the need for a search of the visible objects in the display because a second interaction with the same object is expected from the user. By inflating the hittable area associated with the object expected to be targeted, the second interaction from the user can be performed quickly and less precisely than in traditional hit testing. In one embodiment, any object expected to be targeted next can be designated as a candidate target with a dynamic border.

A dynamic boundary generally approaches a graphical element's initial, static boundary as a function of time. For example the boundary can start or inflate at a maximum or predefined distance and reduce to the size of the associated target. While typically, a dynamic boundary extends beyond an initial, static boundary and thus produces an effective target area larger than the displayed target, the boundary can be selected so as to define an effective area smaller than the displayed target. For example, a hittable area for a target can be reduced so as to be smaller than the displayed target and vary as a function of time so as to increase or decrease based on a determination that user selection of the displayed target is to be likely or unlikely. In addition, a boundary can be calculated for another displayed target based on the first interaction with the selected target. For example, when a first target is not expected to be contacted again promptly after its first selection, other displayed targets can be assigned inflated hittable boundaries so that an initially selected target has a deflated selection zone while one or more other displayed targets have extended selection zones. Alternatively, to enhance repeated selection of the first target, selection zones for other displayed targets can be deflated as a function of time. In some embodiments, distance-time based hit testing using time based boundaries and selection zones can be enabled for some or all displayed targets. In examples in which multiple touches are detected on a screen at the substantially the same time (so called "multi-touch" inputs), the location of the last touch detected can be used in assigning the hit-target. Alternatively, any of the touch inputs at substantially the same time can be used.

FIG. 6A illustrates an exemplary embodiment of a dynamic buffer area 610 around an animated hit target 602 presented in a display 618 at a particular time. As shown in FIG. 6B, at a later time, the displayed animated hit target 602 and the associated dynamic buffer area 610 have changed shape, size, and location. In addition, the relative position of the hit target 602 and the dynamic buffer area 610 can change. Characteristics such as size, shape, position, and orientation of the dynamic buffer area 610 can vary as a function of time. FIG. 6C illustrates the buffer area 610 associated with the hit target 602 at a time at which the buffer area 610 does not enclose any portion of the hit target 602.

In some embodiments of distance-time based hit testing, assigning a hit-target can be based on a particular computing device, a selected application, a user profile, display characteristic such as, for example, display screen size, or display context, as well as the size, location, dimensionality, or animation of a target graphical object. A user can specify user preferences based on a user context such as user location, finger size, dexterity, and personal preferences. A user profile can be based on direct user input, or based on evaluation of one or more user interaction. For example, user norms such as an average typing speed can be estimated and used in defining a dynamic hit target. Users who provide less rapid inputs may prefer that extended dynamic selection decrease more slowly as a function of time than users who interact more rapidly.

Exemplary Advantages

In traditional (static) hit testing, a user often misses an intended target when attempting to interact with a user interface using a touch screen because of the small screen sizes of mobile devices, or other factors such as the speed at which they are trying to hit the target. However, distance-time based hit testing using dynamic buffers can allow quick, sloppy interactions to make accurate selections on such devices as well as reduce the risk of making an unintended input selection if user input is outside of an intended displayed target but within an unintended displayed target. Distance-time based hit testing can make small hit-targets appear easier to hit to users by favoring one target over another in a display. In some embodiments, dynamic buffers can shrink over time and be applied when the likelihood of user error due to quick interactions is higher.

Targets in a display can be enabled with dynamic buffers to handle touch information outside its actual boundaries and act according to what is most likely intended. Thus, distance-time based hit testing can eliminate the need for performing a search of hittable objects upon a touch event in a touch screen display thereby increasing efficiency of computational resources. Such extended hittable areas can be displayed to the user, but typically such extended areas are not displayed in order to avoid a confusing display appearance. The listed and other advantages of distance-time based hit testing can provide a better user experience such as faster typing with fewer errors, and with reduced likelihood of selecting associated actions (such as sending an email prior to completion) that are not intended.

Exemplary Mobile Environment

FIG. 7 is a system diagram depicting an exemplary mobile device 700 including a variety of optional hardware and software components, shown generally at 702. Any components 702 in the mobile device can communicate with any other component, although not all connections are shown, for ease of illustration. The mobile device can be any of a variety of computing devices (e.g., cell phone, smart phone, handheld computer, Personal Digital Assistant (PDA), tablet computer, laptop computer, etc.) and can allow wireless two-way communications with one or more mobile communications networks 704, such as a cellular or satellite network.

The illustrated mobile device 700 can include a controller or processor 710 (e.g., signal processor, microprocessor, ASIC, or other control and processing logic circuitry) for performing such tasks as signal coding, data processing, input/output processing, power control, and/or other functions. The processor 710 can be configured through hardware or software. An operating system 712 can control the allocation and usage of the components 702 and support for one or more application programs 714. The application programs can include common mobile computing applications (e.g., email applications, calendars, contact managers, web browsers, messaging applications), or any other computing application, including the embodiments described herein.

The illustrated mobile device 700 can include memory 720. Memory 720 can include non-removable memory 722 and/or removable memory 724. The non-removable memory 722 can include RAM, ROM, flash memory, a hard disk, or other well-known memory storage technologies. The removable memory 724 can include flash memory or a Subscriber Identity Module (SIM) card, which is well known in GSM communication systems, or other well-known memory storage technologies, such as "smart cards." The memory 720 can be used for storing data and/or code for running the operating system 712 and the applications 714. The applications 714 can, for example, implement any of the technologies described herein. Example data can include web pages, text, images, sound files, video data, or other data sets to be sent to and/or received from one or more network servers or other devices via one or more wired or wireless networks. The memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 700 can support one or more input devices 730, such as a touch screen 732, microphone 734, camera 736, physical keyboard 738 and/or trackball 740 and one or more output devices 750, such as a speaker 752 and a display 754. Other possible output devices (not shown) can include piezoelectric or other haptic output devices. Some devices can serve more than one input/output function. For example, touchscreen 732 and display 754 can be combined in a single input/output device.

A wireless modem 760 can be coupled to an antenna (not shown) and can support two-way communications between the processor 710 and external devices, as is well understood in the art. The modem 760 is shown generically and can include a cellular modem for communicating with the mobile communication network 704 and/or other radio-based modems (e.g., Bluetooth or Wi-Fi). The wireless modem 760 is typically configured for communication with one or more cellular networks, such as a GSM network for data and voice communications within a single cellular network, between cellular networks, or between the mobile device and a public switched telephone network (PSTN).

The mobile device can further include at least one input/output port 780, a power supply 782, a satellite navigation system receiver 784, such as a Global Positioning System (GPS) receiver, an accelerometer 786, gyroscope, and/or a physical connector 790, which can be a USB port, IEEE 7394 (FireWire) port, and/or RS-232 port. The illustrated components 702 are not required or all-inclusive, as any components can deleted and other components can be added.

Exemplary Implementation Environment

Figure 8:
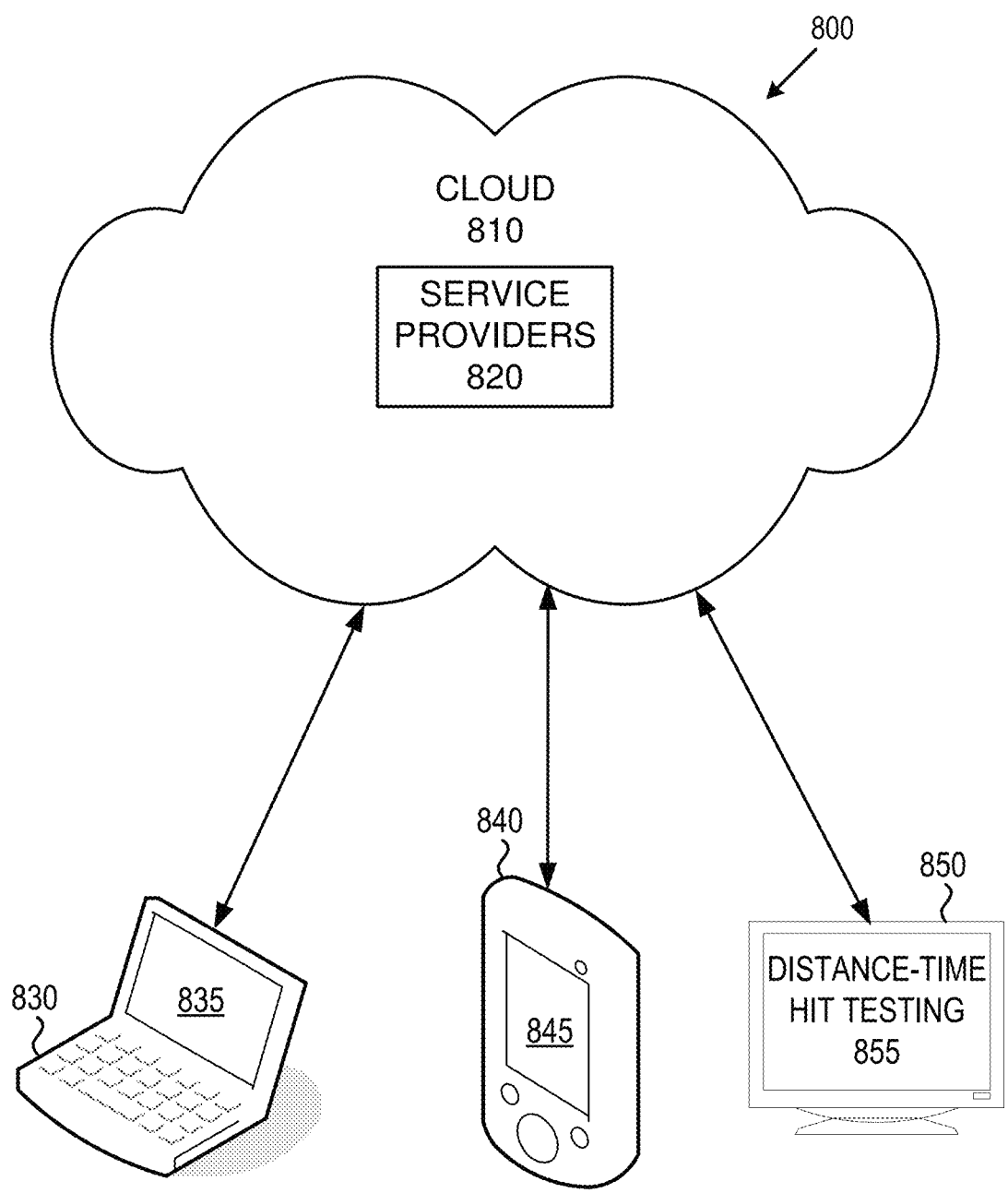
FIG. 8 illustrates a generalized example of a suitable implementation environment.

FIG. 8 illustrates a generalized example of a suitable implementation environment 800 in which the herein described embodiments, techniques, and technologies may be implemented.

In example environment 800, various types of services (e.g., computing services) are provided by a cloud 810. For example, the cloud 810 can comprise a collection of computing devices and displays, which may be located centrally or distributed, that provide cloud-based services to various types of users and devices connected via a network such as the Internet. The implementation environment 800 can be used in different ways to accomplish computing tasks. For example, some tasks (e.g., processing user input and presenting a user interface) can be performed on local computing devices (e.g., connected devices 830, 840, 850) while other tasks (e.g., storage of data to be used in subsequent processing) can be performed in the cloud 810.

In example environment 800, the cloud 810 provides services for connected devices 830, 840, 850 with a variety of screen capabilities and displays some or all of which can be configured to implement dynamic hit testing in response to user inputs via a mouse, touchscreen, game controller, keyboard, trackball, or other input devices. Connected device 830 represents a device with a computer screen 835 (e.g., a mid-size screen). For example, connected device 830 can be a personal computer such as desktop computer, laptop, notebook, netbook, or the like. Connected device 840 represents a device with a mobile device screen 845 (e.g., a small size screen). For example, connected device 840 can be a mobile phone, smart phone, personal digital assistant, tablet computer, and the like. Connected device 850 represents a device with a large screen 855. For example, connected device 850 can be a television screen (e.g., a smart television) or another device connected to a television (e.g., a set-top box or gaming console) or the like. One or more of the connected devices 830, 840, 850 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 800. For example, the cloud 810 can provide services for one or more computers (e.g., server computers) without displays.

Services can be provided by the cloud 810 through service providers 820, or through other providers of online services (not depicted). For example, cloud services can be customized to the screen size, display capability, and/or touch screen capability of a particular connected device (e.g., connected devices 830, 840, 850).

In example environment 800, the cloud 810 provides the technologies and solutions described herein to the various connected devices 830, 840, 850 using, at least in part, the service providers 820. For example, the service providers 820 can provide a centralized solution for various cloud-based services. The service providers 820 can manage service subscriptions for users and/or devices (e.g., for the connected devices 830, 840, 850 and/or their respective users).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

Exemplary Alternatives and Combinations

In view of the many possible embodiments to which the principles of the disclosed technology may be applied, it should be recognized that the illustrated embodiments are only preferred examples and should not be taken as limiting the scope of the invention. Rather, the scope of the invention is defined by the following claims. We therefore claim as our invention all that comes within the scope of these claims.

We claim:

1. A computing device, comprising:
   a touchscreen;
   a processor; and
   a memory storing code that when executed causes the processor to:
   detect a first user contact at a first coordinate X1, Y1, wherein X1 corresponds to a first axis of the touchscreen and Y1 corresponds to a second axis of the touchscreen;
   based on the first coordinate X1, Y1, determine a first selection of a first displayed item on the touchscreen;
   based on the first selection, modify a first display aspect of the touchscreen;
   detect a second user contact at a second coordinate X2, Y2, wherein X2 corresponds to the first axis of the touchscreen and Y2 corresponds to the second axis of the touchscreen;
   determine a first distance between a second displayed item on the touchscreen and the second coordinate X2, Y2;
   determine a second distance between the first displayed item on the touchscreen and the second coordinate X2, Y2;
   based at least on the second coordinate X2, Y2, determine a second user selection, wherein the determination of the second user selection further comprises:
   determining whether the second distance is greater than a predetermined maximum distance;
   determining whether one or more dynamic hit zones is active and, if a first dynamic hit zone is active, determining whether the first distance exceeds a first hit zone displacement limit associated with the first dynamic hit zone, wherein the first dynamic hit zone is associated with the second displayed item on the touchscreen;
   if the first distance exceeds the first hit zone displacement limit or the second distance is greater than the predetermined maximum distance, performing static hit testing on the second coordinate X2, Y2;
   if the first distance does not exceed the first hit zone displacement limit and the second distance is less than the predetermined maximum distance, determining a first dynamic time-based boundary associated with the second displayed item, and:
   if the second coordinate X2, Y2 is within the first dynamic time-based boundary, then assigning the second user contact to the second displayed item;
   if the second coordinate X2, Y2 is outside the first dynamic time-based boundary, then performing static hit testing on the second coordinate X2, Y2; and
   performing static hit testing on the second coordinate X2, Y2, if no dynamic hit zone is active.

2. The computing device of claim 1, wherein the second user contact relates to a user action within a gaming application.

3. The computing device of claim 1, wherein the second user contact relates to text entry via the touchscreen.

4. The computing device of claim 1, wherein the size of the first dynamic time-based boundary is based on an equation that considers a characteristic of the touchscreen.

5. The computing device of claim 4, wherein the equation is d=mt+b, where d represents a buffer distance of the first dynamic time-based boundary, b represents a starting point, t represents time, and m is a scaled slope modifier.

6. The computing device of claim 1, wherein the first dynamic time-based boundary changes over time until it returns to a static hit zone boundary associated with the second displayed item.

7. The computing device of claim 6, wherein the first dynamic time-based boundary initially is larger than the static hit zone boundary associated with the second displayed item.

8. The computing device of claim 1, wherein the touchscreen is pressure sensitive and the determination of the second user selection further comprises evaluating an interaction mass associated with a magnitude of user pressure on the touchscreen.

9. The computing device of claim 1, wherein the second displayed item is in motion on the touchscreen.

10. One or more computer memory devices storing instructions that when executed cause a computing device to:
   display on a display device a background area and a first group of graphical elements, wherein the first group of graphical elements comprises a first graphical element that is in motion that results in a change of location of the first graphical element;
   define a first group of hit areas, each of the hit areas in the first group of hit areas corresponding to one of the graphical elements in the first group of graphical elements, wherein one of the hit areas is a first hit area corresponding to the first graphical element that is in motion;
   detect a first user indication at a first location on the display device, the first user indication corresponding to a selection of the first graphical element that is in motion;
   define a second hit area corresponding to a second graphical element that is in motion that results in a change of position of the second graphical element, wherein the size of the second hit area changes over time based on an equation until it reaches a static size associated with the second graphical element that is in motion;
   detect a second user indication at a second location on the display device;
   identify the second user indication as indicating a selection of the second graphical element that is in motion, based on a determination that the second user indication is within the second hit area corresponding to the second graphical element that is in motion;
   wherein the equation is d=mt+b, where d represents a buffer distance of the hit area relative to the second graphical element, b represents a starting point, t represents time, and m is a scaled slope modifier.

11. The one or more computer memory devices of claim 10, wherein location of the first hit area depends on the motion of the first graphical element.

12. The one or more computer memory devices of claim 10, wherein the size of the second hit area gradually changes according to a linear, exponential, or polynomial function.

13. The one or more computer memory devices of claim 10, wherein the computing device is a mobile phone.

14. The one or more computer memory devices of claim 10, wherein the first and second user indications each is detected by a camera-based motion indicator.

* * * * *